W. LEWIS & J. T. RAMSDEN.
MOLDING MACHINE.
APPLICATION FILED MAR. 14, 1905.

960,974.

Patented June 7, 1910.

2 SHEETS—SHEET 1.

WITNESSES:

INVENTORS:

ATTORNEY.

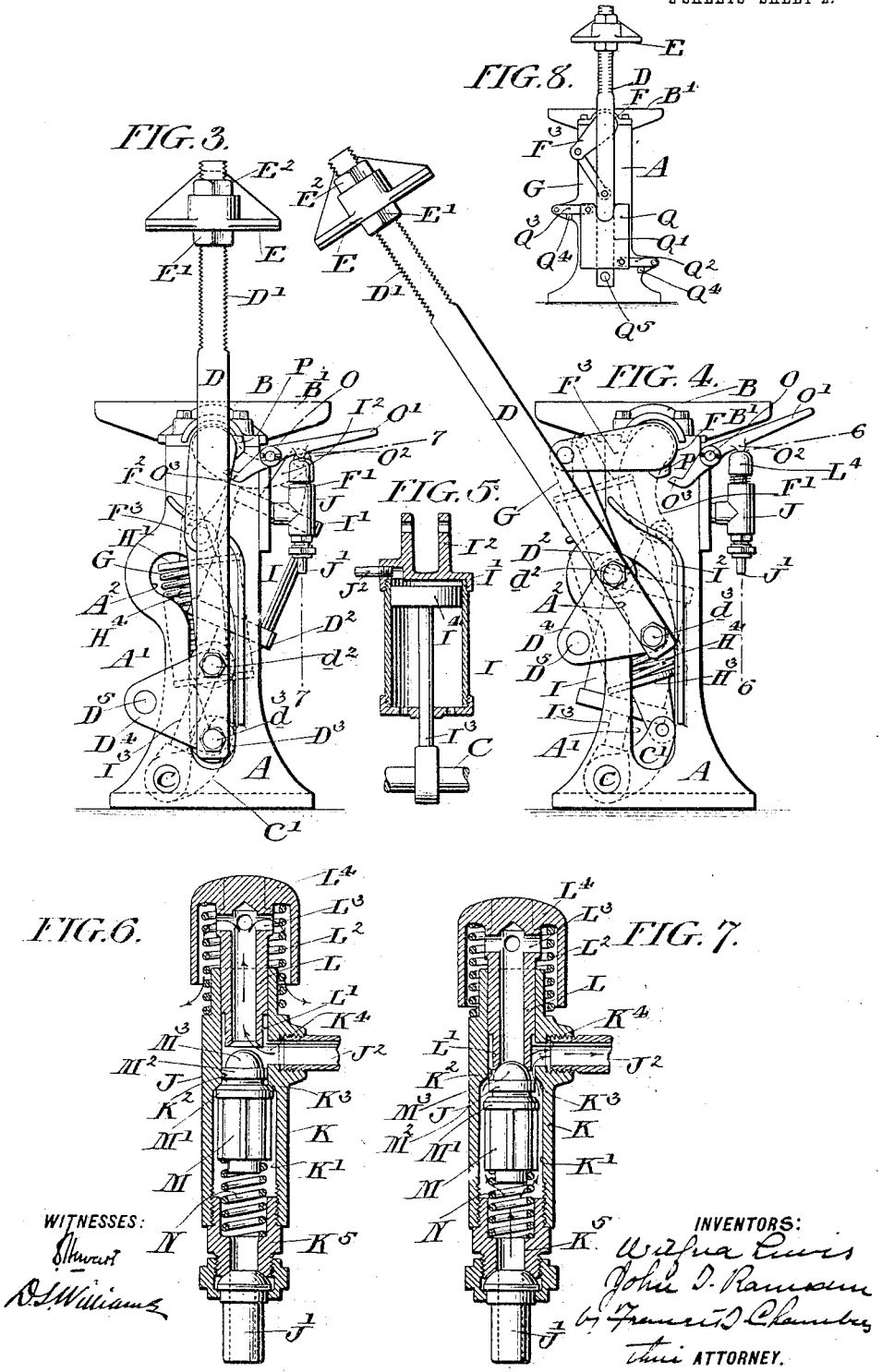

UNITED STATES PATENT OFFICE.

WILFRED LEWIS AND JOHN T. RAMSDEN, OF PHILADELPHIA, PENNSYLVANIA, ASSIGNORS TO THE TABOR MANUFACTURING COMPANY, OF CAMDEN, NEW JERSEY, A CORPORATION OF NEW JERSEY.

MOLDING-MACHINE.

960,974.

Specification of Letters Patent. Patented June 7, 1910.

Application filed March 14, 1905. Serial No. 250,023.

*To all whom it may concern:*

Be it known that we, WILFRED LEWIS and JOHN T. RAMSDEN, both citizens of the United States of America, and residing in the city and county of Philadelphia, in the State of Pennsylvania, have invented a certain new and useful Improvement in Molding-Machines, of which the following is a true and exact description, reference being had to the accompanying drawings, which form a part thereof.

Our invention relates to that class of molding machine known as "squeezers", and has for its object to generally improve the character of such mechanism, and, especially, to provide a strong and simple arrangement which can be worked by power.

The nature of our improvements will be best understood as described in connection with the drawings in which they are illustrated, and in which—

Figure 1:
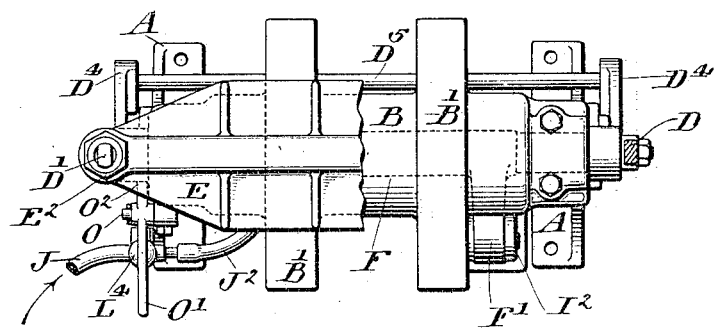
Figure 2:
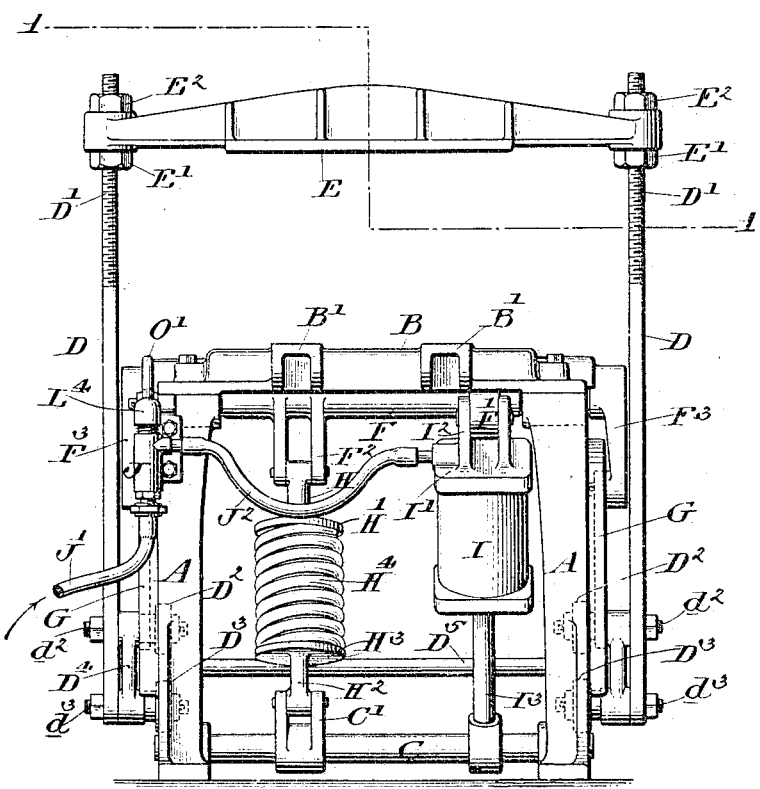

Figure 1, is a plan view of a machine embodying our improvements, with the ramming yoke partly cut away on the line 1—1, of Fig. 2. Fig. 2, is a front elevation of the machine. Fig. 3, a side elevation with the ramming yoke in downward position. Fig. 4, a similar side elevation with the ramming yoke elevated and thrown to one side. Fig. 5, is a sectional view of the actuating cylinder. Fig. 6, a sectional view of the special valve which we prefer to employ for regulating the admission and exhaust to the cylinder, said view showing the valve closed. Fig. 7, is a similar view of the valve, showing the valve partly opened, and Fig. 8, is a side elevation illustrating a modification in the mechanism for guiding the ramming yoke.

A, indicates the housing or frame of the machine, the sides of which are, preferably, as shown, provided with guideways, shown as slots $A'$, $A^2$, the portions $A'$, being vertical and the portions $A^2$, being curved off to the side.

B, is the top part of the frame connecting the grooved side members and provided with flat extensions, as indicated at $B'$, $B'$, for the mold to rest upon.

C, is a shaft connecting the lower part of the frame and having secured to it the laterally extending arm $C'$.

D, D, are wide and thin bars which form the supports for the ramming yoke E, and, by preference, have their upper ends $D'$, formed with a thread on their narrower sides so that the yoke E, is secured in place thereon by nuts $E'$ and $E^2$. To the lower ends of the arms D, D, are secured studs indicated at $d^2$, and $d^3$, and projecting inward into the guideways $A'$, $A^2$, rolls $D^2$, and $D^3$, being secured on the studs so as to move in the guiding grooves. As shown, triangular lugs $D^4$, $D^4$, are also secured to the arms D, through the studs and connected by a cross-bar indicated at $D^5$.

F, is a rock shaft moving in bearings at the top of the frame members A, and having formed on or secured to its outer ends the lever arms $F^3$, $F^3$, which are connected through links G, G, with the studs $d^2$. The rock shaft F, has also extending from it the lever arms $F'$, and $F^2$. $H^4$, is a spring secured between the lever arms $F^2$, and $C'$, a pivot arm H, being connected to the arm $F^2$, and carrying a head $H'$, which is connected to the top of the spring while a pivot arm $H^2$, connected to the arm $C'$, carries a head $H^3$, connected with the bottom of the spring. The spring has for its function to counterbalance the weight of the ramming head and its attachments and it is arranged as shown so as to perform its work by compression.

I, is a power cylinder connected through its head $I'$, and arms $I^2$, with a lever arm $F'$, of the rock shaft, and having its piston $I^4$, connected through the piston rod $I^3$, with the shaft C, the connection being such as to permit the turning of the piston rod on the shaft. The upper end of the cylinder I, is connected through the hose $J^2$, and the valve J, with a supply pipe $J'$ for fluid under pressure. The construction of the valve preferably used by us, and indicated at J, is shown in Figs. 6 and 7, the valve having a casing K, and formed with a valve seat $K^3$, and a cylindrical extension $K^2$, above the valve seat into which opens a port $K^4$, connected with the pipe $J^2$. The lower end of this casing is connected through a head $K^5$ with the supply pipe $J'$.

L, is a hollow plunger working in the cylindrical portion $K^8$, of the casing and having its lower end reduced in diameter, as indicated at $L'$, and lateral escape orifices $L^3$, leading from the top of its central perforation. The head of the plunger is preferably formed as indicated at $L^4$, and the spring L², is utilized to hold the plunger normally in its uppermost position, as indicated in Fig. 6.

M, indicates the valve proper, guided in the lower part of the casing K, and having a seat M', adapted to fit on the casing seat K³, above this seat portion M'. The valve is preferably formed with a cylindrical extension M², fitting in the cylindrical portion K³, of the casing, and above this a valve pad M³, extends in line with the bottom of the plunger. A spring N, acts to normally hold the valve in contact with its seat. O, best shown in Figs. 3 and 4, is a pivot for the valve lever O', which is formed with a lug O², resting in contact with the plunger head L⁴. The lever is also provided with an extension O³, which extends out toward the rock shaft, as shown, and the rock shaft has formed on or secured to it a stop lug P, with which the end of the lever extension O³, comes in contact when the rock shaft is in the position shown in Fig. 4 and which holds the lever from accomplishing its full downward stroke until the rock shaft has rotated through a definite part of its movement for purposes which will be described.

In the modification best shown in Fig. 8, the yoke supporting bars D, are shown as guided in a block Q, one such block situated on each side of the housing, the said block having a guideway, indicated at Q', for the bars, and being connected with the housing through the links Q², Q³, which, in the position shown in the drawings, rest on stationary lugs Q⁴, but which are able to move up when the pins, indicated at Q⁵, on the bottoms of the bars D, come in contact with the bottoms of the guide blocks Q.

It will be seen in Fig. 4, which shows the ramming yoke in retracted position, that the yoke head is swung to one side by means of the engagement of the rollers on the bars D, with the guideways A', A². It will also be seen that when pressure fluid is admitted to the cylinder I, that the arm F', and the rock shaft F, are rotated in an anti-clockwise direction, the spring H⁴, compressed and the arms F³, turned downward their motion being communicated through the links G to the yoke supports D, which, in their downward motion, are brought to a vertical position and thus guided vertically downward bringing the yoke down upon the mold resting on the tables B'. The heavy yoke E, in its lateral movements, exerts a good deal of strain on the supporting bars D, which are preferably made wide and thin with their broader faces in the direction of the lateral movement and we have found that the yoke can be securely attached to these wide and thin bars by the simple expedient of threading the narrow edges of the tops of these bars and clamping the yokes thereto by the nuts E', and E², as shown. It is highly important in this particular, or any other power driven machine of the kind, that the lateral movements imparted to the ramming yoke should not be so quick as to expose the machine to undue strains, and we have therefore organized our machine so that the pressure fluid is admitted to the cylinder first through a narrow or choked orifice and after the yoke and its arms have assumed a vertical position, with the full force necessary to the proper ramming of the mold, and to accomplish this function as well as to provide a thoroughly suitable valve for our machine we have devised the valve and its connections which are shown in the drawings. It will be seen that, in normal position, as shown in Fig. 6, the pressure fluid is cut off from the actuating cylinder, and the cylinder opened to exhaust through the hollow plunger L. When it is desired to admit pressure fluid to the cylinder the plunger is pressed down until its longitudinal orifice is closed by coming in contact with the valve M³, and the valve pressed down, as shown in Fig. 7. In this position the piston like extension M², of the valve affords a choke connection for the pressure fluid to the cylinder and by pressing the valve still farther down a full admission of pressure fluid is provided for. Our machine provides automatically for the proper operation of the valve. The valve actuating lever O', being prevented from making its full opening stroke at the beginning of the ramming operation by the contact of its extension O³, with the stop P, on the rock shaft, therefore the first operation of pressing down the valve lever is to open the restricted passage to the cylinder which with proper slowness brings the yoke to its vertical position, the movement of the rock shaft shifting the stop P, until it clears the lever extension O³, permitting the full opening of the valve and the prompt and forcible application of full power to the ram.

During the ramming stroke, the lever arms F² move toward the position in which they are in alinement with the line of action of the counterbalancing spring and the lever arm F' moves away from the position in which it is in alinement with the line of action of the piston and cylinder. In consequence, the effective leverage on the rock shaft exerted by the spring decreases and that of the piston and cylinder increases during the ramming stroke.

In the modification shown in Fig. 8, it will be seen that the block Q, guides the yoke through its vertical movements and that when at the end of the vertical upward movement of the yoke the stop pins Q⁵, come in contact with the bottoms of the blocks Q, the said blocks will be raised and guided by the links Q², and Q³, into an oblique position thus effecting the movement of the ramming yoke, as shown in Fig. 4. The reverse movement of the rock shaft restores the blocks Q, to position shown in Fig. 8, where the links Q³, and Q³, rest on the stops Q⁴ and Q⁴.

Having now described our invention, what we claim as new, and desire to secure by Letters Patent is—

1. In a molding machine, a ramming yoke in combination with means for positively guiding said yoke through a straight path during the act of ramming and through a divergent curved path during a portion of its return stroke, a rock shaft supported on the machine housing, connections from the rock shaft to actuate the ramming yoke, a cylinder and piston connection to actuate the rock shaft, means for admitting and exhausting pressure fluid from said cylinder, and a counterbalancing spring acting through compression to balance some or all of the weight of the yoke and its attachments.

2. In a molding machine, a ramming yoke in combination with means for positively guiding said yoke through a straight path during the act of ramming and through a divergent curved path during a portion of its return stroke, a rock shaft supported on the machine housing, lever arms attached to said shaft and connected to actuate the yoke, lever arms F', and F² also attached to the shaft, a cylinder and piston connected to actuate the rock shaft through arm F'', and a counterbalancing spring connected with the shaft through arm F².

3. In a molding machine having a ramming yoke and power cylinder for actuating said yoke, a valve governing the admission and exhaust from said cylinder, in combination with a regulating stop shifted in accordance with the movements of the yoke, said stop acting to prevent the full opening of the valve to admit fluid to the cylinder until the yoke has moved through a portion of its working stroke.

4. In a molding machine having a ramming yoke and a power cylinder for actuating said yoke, a valve J, situated in the conduit for pressure fluid, said valve having in combination a casing K, with seat K³, and cylindrical extension K², and outlet K⁴, leading to the cylinder, a valve M', normally seated on seat K³, a plunger L, moving in cylinder K², and formed with an outlet passage, means for normally holding the plunger out of contact with the valve and means for pressing the plunger down on the valve to open it and close the outlet passage.

5. In a molding machine having a ramming yoke and a power cylinder for actuating said yoke, a valve J, situated in the conduit for pressure fluid, said valve having in combination a casing K, with seat K³, and cylindrical extension K², and outlet K⁴, leading to the cylinder, a valve M', normally seated on seat K³, a plunger L, moving in cylinder K², and formed with an outlet passage, means for normally holding the plunger out of contact with the valve; a lever O', for pressing the plunger down on the valve, and a movable stop shifting with the movements of the yoke and acting to prevent the full movement of the lever O', until the yoke has moved through a portion of its working stroke.

6. In a molding machine, a ramming yoke in combination with means for guiding said yoke during the ramming and return strokes, a rock shaft supported on the machine housing, lever arms attached to said shaft and connected to actuate the yoke, a cylinder and piston connected to said shaft for actuating it in the ramming direction, and a counterbalancing spring connected to the shaft and tending to actuate it in the other direction, said spring and the cylinder and piston having their lines of action on the shaft so arranged that the effective leverage exerted by the spring decreases and that of the cylinder and piston increases during the ramming stroke.

7. In a molding machine, a housing or frame having two parallel guideways formed in it, each guideway having a lower vertical portion and an upper diverging portion, in combination with a ramming yoke having two downwardly extending arms, each with a portion adjacent one of the guideways, each arm being provided with two guides entering the corresponding guideway and arranged one above the other so that the ramming yoke moves in a straight line when the guides are in the lower vertical portions of the guideways, and is moved in a diverging curved path when the upper guides on the arms move into the diverging portions of the guideways.

WILFRED LEWIS.
JOHN T. RAMSDEN.

Witnesses:
D. STEWART,
ARNOLD KATZ.